United States Patent [19]

Yamamoto

[11] 4,015,276
[45] Mar. 29, 1977

[54] ELECTRIC SHUTTER OPERATING CIRCUITS FOR USE IN PHOTOGRAPHIC CAMERAS

[75] Inventor: Masaru Yamamoto, Machida, Japan
[73] Assignee: Yashica Co., Ltd., Tokyo, Japan
[22] Filed: Sept. 5, 1974
[21] Appl. No.: 503,328

[30] Foreign Application Priority Data

Sept. 13, 1973  Japan .................. 48-102657
Sept. 13, 1973  Japan .................. 48-102658

[52] U.S. Cl. .................. 354/37; 354/51
[51] Int. Cl.² .................. G03B 7/00; G03B 7/08
[58] Field of Search .................. 354/36, 37, 38, 48, 354/50, 51

[56] References Cited

UNITED STATES PATENTS

| | | | |
|---|---|---|---|
| 3,641,890 | 2/1972 | Ono .................. | 354/37 |
| 3,678,826 | 7/1972 | Mori et al. .................. | 354/50 |
| 3,690,230 | 9/1972 | Mori et al. .................. | 354/24 |
| 3,750,540 | 8/1973 | Yanagisawa et al. .................. | 354/51 |
| 3,763,751 | 10/1973 | Akiyana .................. | 354/37 |
| 3,855,603 | 12/1974 | Ichihashi .................. | 354/51 |
| 3,936,842 | 2/1976 | Nanba et al. .................. | 354/51 |

Primary Examiner—L. T. Hix
Assistant Examiner—J. A. LaBarre
Attorney, Agent, or Firm—Charles E. Pfund

[57] ABSTRACT

In an electric shutter operating circuit for use in a photographic camera of the class wherein the operation of the shutter is controlled in accordance with the brightness of an object, and information regarding the iris opening and the photosensitivity of the film used, there are provided a photoelectric element for generating an electric signal corresponding to the brightness, means for generating information signals regarding iris opening and the photosensitivity, a comparator circuit for comparing the electric signal and the information signals, means to feedback the output of the comparator circuit to the input thereof, a memory capacitor connected on the output side of the comparator circuit for storing an electric quantity corresponding to the brightness, an amplifier connected to respond to the terminal voltage of the memory capacitor, and means responsive to the output of the amplifier for controlling the operation of the shutter of the camera.

5 Claims, 2 Drawing Figures

ELECTRIC SHUTTER OPERATING CIRCUITS FOR USE IN PHOTOGRAPHIC CAMERAS

BACKGROUND OF THE INVENTION

This invention relates to an electric shutter operating circuit for use in a TTL single lens reflex camera.

As is well known in the art, since in the TTL single lens reflex camera, the intensity of the light from the field or an object to be photographed and passing through the lens system is measured, it is impossible to make such measurement at the time of photographing. For this reason, in an electric shutter operating circuit for use in the TTL single lens reflex camera it is necessary to provide a special circuit that memorizes the value of the measured light before commencing photographing. Although various types of practically applicable special circuits have been proposed, a circuit utilizing a negative feedback circuit has been deemed satisfactory because it can operate stably. However, a prior art specific circuit generally comprises a balanced circuit incorporating a differential amplifier circuit, or a circuit including means for logarithmically compressing and inserting information, so that such circuit has a tendency to become unstable. For this reason, it is advantageous to provide a negative feedback circuit as has been pointed out hereinabove. Several types of electric shutter operating circuits provided with negative feedback circuits have already been announced but in the operating circuit of this type it is necessary to use high grade technical skills for inserting compensating information regarding the opening of the iris diaphragm, the photosensitivity of the film used, etc. If such skills were not relied upon, even when information corrections are made these corrections would be automatically cancelled.

SUMMARY OF THE INVENTION

It is an object of this invention to provide an improved electric shutter operating circuit which can operate stably and can incorporate information signals regarding the photographing conditions such as iris opening, brightness of the object, the photosensitivity of the film.

Another object of this invention is to provide improved electric shutter operating circuit especially suitable for use in the TTL single lens reflex cameras.

Still further object of this invention is to provide an improved electric shutter operating circuit capable of readily compensating for the off-set voltage of the circuit.

According to this invention, these and other objects can be accomplished by providing an electric shutter operating circuit for use in a photographic camera of the class wherein the operation of the shutter of the camera is controlled in accordance with the brightness of an object to be photographed, and information regarding the iris opening and the photosensitivity of the photographic film used, characterized in that there are provided a photoelectric element for generating an electric signal corresponding to the brightness, a first input circuit responsive to the electric signal and including a first information circuit which inserts into the first input circuit an information signal regarding one of the photographing conditions including the iris opening and the photosensitivity of the film, a second input circuit responsive to a feedback signal to be described later and including a second information circuit which inserts into the second input circuit an information signal regarding the other photographing condition, a high impedance comparator circuit for comparing the signal from the first and second input circuits, a memory capacitor connected on the output side of the comparator circuit for storing an electric quantity corresponding to the brightness, an amplifier connected to respond to the terminal voltage of the memory capacitor, means responsive to the output of the amplifier for controlling the operation of a shutter of the camera, and a feedback circuit responsive to the output from the amplifier for feeding back said feedback signal to the second input circuit.

Actually, the comparator circuit is constituted by a pair of transistors respectively responsive to the signals from the first and second input circuits. Further, the amplifier also comprises a transistor having the same characteristic as said transistors.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Figure 1:
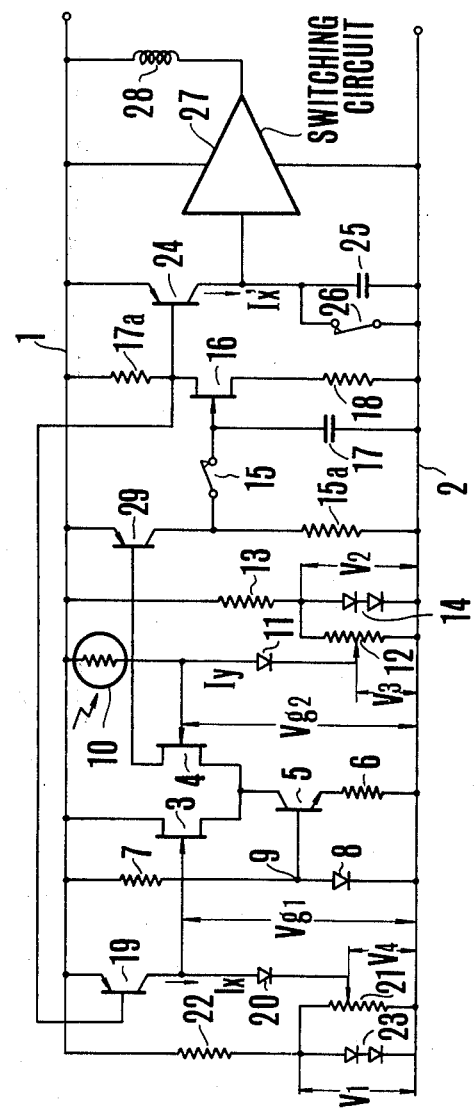
FIG. 1 is a connection diagram of one example of the electric shutter operating circuit embodying the invention.

A preferred embodiment of this invention illustrated in FIG. 1 comprises a pair of field effect transistors 3 and 4 which are connected to constitute a differential amplifier which acts as a comparator having a high input impedance. The source electrodes of these field effect transistors are connected together and are connected to the negative source conductor 2 of a source of direct current via a transistor 5 and a resistor 6. The base electrode of transistor 5 is connected to the juncture between a resistor 7 and a diode 8 which is connected in series across positive and negative source conductors 1 and 2. The resistors 6 and 7, transistor 5 and diode 8 cooperate to apply a definite bias potential to the differential amplifier. The gate electrode of the field effect transistor 4 is connected to one terminal of a photoconductive element 10 which varies its resistance value in accordance with the brightness of the field to be photographed, said terminal being connected through a diode 11 to the movable arm of a variable resistor 12 which is set in accordance with the photosensitivity of the film used or the iris opening. One end of the variable resistor 12 is connected to the negative source conductor 2 while the other end is connected to the positive source conductor 1 via a resistor 13. Across the opposite ends of the variable resistor 12 are connected a plurality of serially connected diodes 14. The drain electrode of the field effect transistor 3 is connected directly to the positive source conductor 1 whereas the drain electrode of the field effect transistor 4 is connected to the base electrode of a transistor 29 having its emitter electrode connected to the positive source conductor 1. The collector electrode of transistor 29 is connected to the negative source conductor 2 via resistor 15a. The collector electrode of transistor 29 is also connected to the gate electrode of a field effect transistor 16 through a first switch 15 which is arranged to be opened immediately before the light from the object to the photoconductive element 10 is interrupted. A memory capacitor 17 is connected across the gate electrode of the field effect transistor 16 and the negative source line 2. The drain and source electrodes of the field effect transistor 16 are connected to the positive and negative source conductors 1 and 2 respectively through resistors 17a and 18. Further, the drain electrode of the field effect transistor 16 is also connected to the base electrode of a transistor 19. The emitter electrode of this transistor is connected to the positive source conductor 1 while the collector electrode is connected through a diode to a movable arm of a variable resistor 21 which is used to set information regarding the film sensitivity or iris opening. Transistor 19 functions to apply a negative feedback to the differential amplifier so that the collector electrode of transistor 19 is connected to the gate electrode of the field effect transistor 3. The lower terminal of the variable resistor 21 is connected to the negative source conductor 2 whereas the upper terminal is connected to the positive source conductor 1 via resistor 22. A plurality of serially connected diodes 23 are connected in parallel with variable resistor 21. The drain electrode of the field effect transistor 16 is connected to the base electrode of a current controlling transistor 24 having an identical characteristic as that of transistor 19. The emitter electrode of the current controlling transistor 24 is connected to the positive source conductor 1 whereas the collector electrode is connected to the negative source conductor 2 through an integrating capacitor 25 which is shunted by a second switch 26. This switch is opened when the first curtain of the shutter runs. The collector electrode of transistor 24 is connected to a switching circuit 27 which is used to energize an operating coil 28 for allowing the second curtain to run.

The electric shutter operating circuit described above operates as follows. When the lens of a camera equipped with this circuit is directed to an object, the light therefrom impinges upon the photoconductive element 10 through the lens. Then the differential amplifier operates in accordance with the resistance value of the photoconductive element 10, and the signal produced by the differential amplifier is amplified by transistor 29 and stored in the memory capacitor 17. The output of transistor 29 is also applied to the base electrode of transistor 19 via the field effect transistor 16 with the result that the collector current of transistor 19 is controlled in accordance with the output signal from the differential amplifier. The collector current of transistor 19 is denoted by $I_x$ and the gate voltage generated by the collector current and applied to the gate electrode of the field effect transistor 3 by $V_{g1}$. A gate voltage $V_{g2}$ determined by the resistance value of the photoconductive element 10 is applied to the gate electrode of the field effect transistor 4. It should be understood that the differential amplifier operates such that $V_{g2}$ is substantially equal to $V_{g1}$. Fractional voltage $V_4$ and $V_3$ derived from the terminal voltages $V_1$ and $V_2$ across diodes 23 and 14 by the actions of the variable resistors 21 and 12, respectively are added to the gate voltages $V_{g1}$ and $V_{g2}$. Under the bias conditions described above, when any one of the conditions of such elements as photoconductive element 10, diodes 11 and 20 and transistor 19 varies, the negative feedback action immediately becomes effective to make substantially equal the gate voltages $V_{g1}$ and $V_{g2}$. Assume now that the resistance value of the photoconductive element 10 varies in response to the variation in the brightness of the object. This results in the variation of the gate voltage $V_{g2}$, thus creating a potential difference with respect to the gate voltage $V_{g1}$. A signal generated by this potential difference is impressed upon the base electrode of transistor 29 and the signal amplified thereby is applied to and stored in the memory capacitor 17 via the first switch 15. The signal amplified by transistor 29 is further amplified by field effect transistor 16 and is then applied to the base electrode of transistor 19. In this manner, this transistor is controlled in accordance with the variation in the brightness of the object to vary its output current $I_x$, thus making equal gate voltages $V_{g1}$ and $V_{g2}$. More particularly, the output current $I_x$ from the transistor 19 is controlled in proportion to the resistance value of the photoconductive element 10.

Since the terminal voltages across diodes 11 and 20 are proportional to the currents $I_x$ and $I_y$ flowing therethrough there are following relations.

$$V_{g1} - V_4 = f(I_x) \tag{1}$$

$$V_{g2} - V_3 = f(I_y) \tag{2}$$

Assuming that $V_{g1} = V_{g2}$ and by substituting equation (2) into equation (1), we obtain $$V_4 - V_3 = f(I_y) - f(I_x) \tag{3}$$

This equation shows that it is possible to vary the output current $I_x$ of transistor 19 to any value in accordance with the potential difference between voltages $V_3$ and $V_4$ produced by the variable resistors 12 and 21. This means that by representing the iris opening and the film sensitivity by the voltages $V_3$ and $V_4$ respectively, it is possible to set the output current $I_x$ from transistor 19 to any desired value. In this manner, as the output current $I_x$ from transistor 19 corresponds to the variation in the brightness of the object containing information regarding the iris opening and the film sensitivity, for the purpose of obtaining a current identical to said output current, the integrating capacitor 25 is connected to be charged by current $I_x'$ proportional to $I_x$ through transistor 24 having the same characteristics as transistor 19. To operate the shutter, a shutter release button, not shown, is depressed to raise a reflecting mirror, not shown. Then the first switch 15 is opened. However, since the information of the light measured up to the instant of photographing is stored in the memory capacitor 17, this information wil be amplified by the field effect transistor 16 for operating transistor 24. When transistor 24 turns on, it produces an output current $I_x'$ proportional to the output current $I_x$ from transistor 19. When the second switch 26 is opened in synchronism with the running of the first curtain of shutter, not shown, the output current $I_x'$ from transistor 24 flows through the integrating capacitor 25 thus commencing to charge it. When the terminal voltage of the integrating capacitor 25 reaches a predetermined value the switching circuit 27 operates whereby the coil 28 for operating the second curtain is energized thus completing the shutter operation.

In the foregoing embodiment where logarithmical diodes are used as diodes 11 and 20, by using a photoconductive element whose $\gamma \approx 1$ a logarithmically varying output current $I_x$ may be obtained. Where a photoconductive element whose $\gamma \approx 0.8$ is used in combination with a transistor connected to a diode it is also possible to obtain a logarithmically varying output current $I_r$. However, latter arrangement is advantageous because it can be designed extremely readily. The photoconductive element may be substituted by any other element that can convert light into an electrical signal such as a photoelectromotive element.

As has been described in detail in the foregoing, according to this invention, since an electric signal corresponding to the variation in the light from the field and information regarding the iris opening are applied to the first input terminal of a differential amplifier whereas a negative feedback signal and information regarding the photosensitivity of the film are applied to the second input of the differential amplifier, it is possible to greatly improve the stability of the operation of the circuit. Further, by the suitable selection of the voltage-current characteristics of the elements utilized to apply signals and information to the first and second input terminals it is possible to control logarithmically the shutter time according to the characteristics of the elements. Further, in accordance with this invention, it is possible to apply the information regarding the iris opening and the film photosensitivity to the first and second input terminals of the differential amplifier while it is maintained in a balanced condition. The invention also readily enables the compensation for the offset voltage of the circuit.

Figure 2:
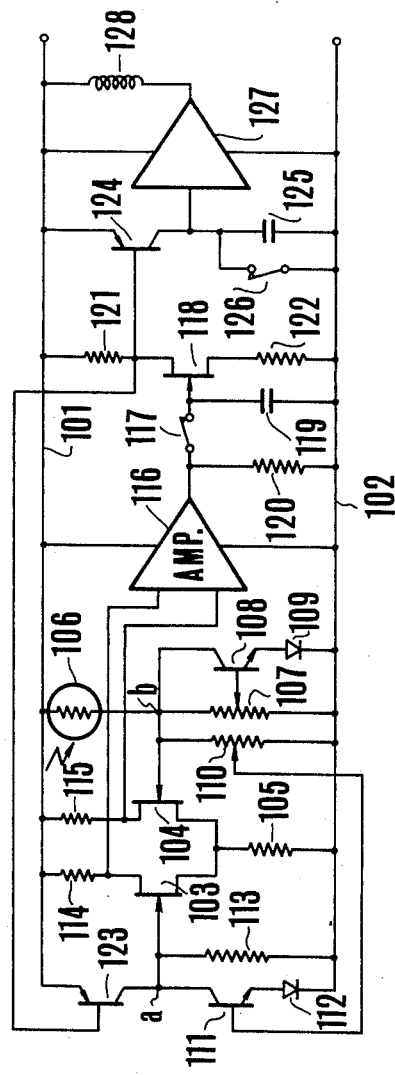
FIG. 2 is a connection diagram showing a modified embodiment of this invention.

In a modified embodiment of this invention shown in FIG. 2, there are also provided a pair of field effect transistors 103 and 104 which are connected to constitute a differential amplifier acting as a high input-impedance comparator circuit. The source electrodes of the field effect transistors 103 and 104 are connected to a negative source conductor 102 through a resistor 105. The gate electrode of the field effect transistor 104 is connected to a positive source conductor 101 through a photoconductive element 106 which generates an electric signal corresponding to the variation in the brightness of the field or object to be photographed and to the negative source conductor 102 via first variable resistor 107 which is set in accordance with the iris opening information or the like. Further, the gate electrode of the field effect transistor 104 is connected to the collector electrode of a transistor 108, the emitter electrode thereof being connected to the negative source conductor 102 via diode 109 poled as shown. The base electrode of the transistor 108 is connected to the movable arm of the first variable resistor 107. The first variable resistor 107, transistor 108 and diode 109 cooperate to form a constant voltage circuit. Between the gate electrode of the field effect transistor 104 and the negative source conductor 102 is connected a second variable resistor 110 which is adjusted in accordance with the film sensitivity information, and the movable arm of this resistor is connected to the base electrode of a transistor 111. The emitter electrode of transistor 111 is connected to the negative source conductor 102 via a diode 112 while the collector electrode is connected to the gate electrode of the field effect transistor 103. A resistor 113 is connected between the gate electrode of the field effect transistor 103 and the negative source conductor 102. The drain electrodes of respective field effect transistors 103 and 104 are connected to the positive source conductor 101 and to the inputs of an operational amplifier 116, the output thereof being connected to the gate electrode of a field effect transistor 118 via a first switch 117 which is opened immediately prior to the interception of the light impinging upon the photoconductive element 106. A memory capacitor 119 is connected between the gate electrode of the field effect transistor 118 and the negative source conductor 102 for storing the information regarding the light measured, and a resistor 120 is connected between the output terminal of the operational amplifier 116 and the negative source conductor 102. The drain electrode and the source electrode of the field effect transistor 118 are connected across the positive and negative source conductors 101 and 102 respectively through resistors 121 and 122. The drain electrode of the field effect transistor 118 is connected to the base electrode of a transistor 123 with its collector electrode connected with the gate electrode of the field effect transistor 103, and its emitter electrode connected with the positive source conductor 101. The drain electrode of the field effect transistor 118 is also connected to the base electrode of a current controlling transistor 124 having the same characteristic as said transistor 123. The emitter electrode of transistor 124 is connected to the positive source conductor 101 whereas the collector electrode is connected to the negative source conductor 102 through an integrating capacitor 125. In parallel with the integrating capacitor 125 is connected a second switch 126 which is opened in synchronism with the operation of the first curtain of shutter, not shown. Again a switching circuit 127 for energizing an operating coil of the second curtain is connected to the collector electrode of transistor 124.

The operation of the modified embodiment is as follows.

When the light from an object, not shown, is projected upon the photoconductive element 106 through a lens of the camera, not shown, the resistance value of the photoconductive element 106 varies. Assume now that the potential of a point b is increased. This also increases the potential appearing at the movable arm of the first variable resistor 107 to increase the forward current of transistor 108 with the result that the collector current is increased thus lowering the potential of point b. On the other hand, increase in the potential at point b is detected by the field effect transistor 104, and the output from this transistor is amplified by the operational amplifier 116 and is then stored in the memory capacitor 119. After being amplified by the field effect transistor 118, the light information is fed back to the base electrode of the transistor 123 over a feedback circuit. This feedback signal is a negative feedback signal so that when the potential of point a increases beyond that of point b, the fed back signal operates to bring the potential of point a back to the original value. Since transistor 111 is forwardly biased by the potential appearing at the movable arm of the second variable resistor 110, as the biasing potential increases, the potential of point a is decreased. In this manner, it is possible to positively return the potential of point a to the original condition by the actions of transistors 123 and 111. The light information stored in the memory capacitor 119 is applied to transistor 123 through field effect transistor 118 so as to maintain the differential amplifier in a balanced condition with the result that it is possible to always provide an accurate light information even when the circuit condition varies. In consequence, when the light impinging upon the photoconductive element 106 is intercepted by the depression of the shutter release button, not shown, the first switch 117 is opened. However, as the light information measured until that time has been stored in the memory capacitor 119 a signal representing this information is amplified by the field effect transistor 118 and applied to the base electrode of transistor 124. As this transistor has the same characteristic as transistor 123, it produces the same output as transistor 123. As the depression of the shutter release button is continued, the second switch 126 is opened concurrently with the commencement of running of the first curtain of shutter. As a result, the integrating capacitor 125 is charged by the output current of the transistor 124, and when the terminal voltage of the integrating capacitor 125 reaches a predetermined value, switching circuit 127 operates to energize coil 128 for operating the second curtain of shutter thereby completing the shutter operation.

In this modified embodiment an electric signal representing the variation in the brightness of an object is impressed upon the first input of a differential amplifier which acts as a comparator, and the output of the differential amplifier is negatively fed back to the second input of the differential amplifier. Further, a constant voltage circuit which may be incorporated with an information regarding the iris opening or film sensitivity is provided for the first input of the differential amplifier. Similarly, a second constant voltage circuit which may also be incorporated with an information regarding the film sensitivity or the iris opening is provided for the second input of the differential amplifier. Moreover, as an integrating capacitor is charged by a signal having the same value as the negatively fed back signal and since the shutter operation is completed when the integrating capacitor is charged up to a predetermined value, it is possible to make highly stable the operation of the circuit and to accurately measure the light from the object. By the suitable adjustment of the constant voltage circuit it is possible to match the constant voltage characteristic thereof with any characteristic of the photoelectric element. Adjustment of the output voltage of the constant voltage circuit permits ready compensation for the offset voltage of the circuit.

While the invention has been described in terms of some preferred embodiments thereof, it will be clear that many changes and modifications will be obvious to one skilled in the art without departing from the spirit and scope of the invention as defined in the appended claims.

What is claimed is:

1. An electric shutter operating circuit for use in a photographic camera comprising:

a photoelectric element for generating an electric signal corresponding to the brightness of an object to be photographed;

a first potentiometer which is set in accordance with the iris opening of the camera and a second potentiometer connected parallel with said first potentiometer which is set in accordance with the photosensitivity of photographic film used;

a high input impedance comparator circuit for comparing signals from said first and second potentiometers, said comparator circuit including a first field effect transistor with its gate connected to said first potentiometer and said photoelectric element and a second field effect transistor with its gate inter-connected to the gate of said first field effect transistor through a transistor which is controlled from said second potentiometer in accordance with the setting representing said photosensitivity of film used, the drain electrodes of said first and second field effect transistors being connected via an operational amplifier to a memory capacitor connected on the output side of said comparator circuit to store an electric quantity corresponding to said brightness;

an amplifier connected to respond to the terminal voltage of said memory capacitor;

operating circuit means responsive to the output of said amplifier for controlling the operation of a shutter of said camera; and a feedback circuit responsive to the output from said amplifier for feeding back a feedback signal to said gate of said second field effect transistor.

2. The electric shutter operating circuit according to claim 1 wherein said amplifier has a high input impedance and said operating circuit means responsive to the output of said amplifier further comprises a current control circuit connected in parallel with said feedback circuit and constructed to produce a signal proportional to said feedback signal, an integrating capacitor connected to said current control circuit and a switching circuit responsive to the voltage across said integrating capacitor for closing said shutter.

3. The electric shutter control circuit according to claim 2 wherein said feedback includes a transistor and said current control circuit comprises a current controlling transistor having the same characteristic as said feedback circuit transistor for applying said feedback signal.

4. The electric shutter operating circuit according to claim 2 wherein said memory capacitor is connected to the output of said comparator circuit through a switch which is arranged to be opened before the light from the object to said photoelectric element is interrupted.

5. The electric shutter operating circuit according to claim 2 wherein a second switch is connected across said integrating capacitor, said second switch being opened concurrently with the opening of the shutter.

* * * * *